(12) United States Patent
Benoit et al.

(10) Patent No.: US 10,168,460 B2
(45) Date of Patent: Jan. 1, 2019

(54) INTEGRATED QUANTUM DOT OPTICAL CONSTRUCTIONS

(71) Applicant: 3M INNOVATIVE PROPERTIES COMPANY, St. Paul, MN (US)

(72) Inventors: Gilles J. Benoit, Minneapolis, MN (US); John A. Wheatley, Lake Elmo, MN (US); James A. Thielen, Hugo, MN (US); David Scott Thompson, West Lakeland, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/766,641

(22) PCT Filed: Feb. 4, 2014

(86) PCT No.: PCT/US2014/014539
§ 371 (c)(1),
(2) Date: Aug. 7, 2015

(87) PCT Pub. No.: WO2014/123836
PCT Pub. Date: Aug. 14, 2014

(65) Prior Publication Data
US 2016/0003998 A1    Jan. 7, 2016

Related U.S. Application Data

(60) Provisional application No. 61/762,645, filed on Feb. 8, 2013.

(51) Int. Cl.
*G02F 1/133*    (2006.01)
*F21V 8/00*    (2006.01)
(Continued)

(52) U.S. Cl.
CPC ............ *G02B 6/0026* (2013.01); *B82Y 20/00* (2013.01); *G02B 6/003* (2013.01); *G02B 6/0025* (2013.01);
(Continued)

(58) Field of Classification Search
None
See application file for complete search history.

(56) References Cited

U.S. PATENT DOCUMENTS 5,175,030 A    12/1992 Lu
5,183,597 A    2/1993 Lu
(Continued)

FOREIGN PATENT DOCUMENTS

CN    202521397 U    11/2012
EP    2 068 193    6/2009
(Continued)

OTHER PUBLICATIONS

Davies, "The Separation of Airborne Dust and Particles," Proceedings of the Institute of Mechanical Engineers, London, 1952, vol. 1B, No. 1-12, pp. 185-198.
(Continued)

*Primary Examiner* — James Dudek
(74) *Attorney, Agent, or Firm* — Lisa P. Fulton

(57) ABSTRACT

An optical construction includes a quantum dot film element including a plurality of quantum dots, a first optical recycling element, and a first low refractive index element separating the quantum dot film element from the first optical recycling element. The first low refractive index element has a refractive index of 1.3 or less.

13 Claims, 1 Drawing Sheet

(51) Int. Cl.
    *B82Y 20/00*     (2011.01)
    *G02F 1/1335*     (2006.01)

(52) U.S. Cl.
    CPC ..... *G02B 6/0031* (2013.01); *G02F 1/133502* (2013.01); *G02F 1/133617* (2013.01); *G02F 2001/133614* (2013.01); *G02F 2202/36* (2013.01); *Y10S 977/774* (2013.01)

(56) References Cited

U.S. PATENT DOCUMENTS

| | | | |
|---|---|---|---|
| 5,751,388 | A | 5/1998 | Larson |
| 5,793,456 | A | 8/1998 | Broer |
| 5,808,794 | A | 9/1998 | Weber |
| 5,825,543 | A | 10/1998 | Ouderkirk |
| 5,867,316 | A | 2/1999 | Carlson |
| 5,882,774 | A | 3/1999 | Jonza |
| 6,107,364 | A * | 8/2000 | Fong ............... C08F 212/12 359/385 |
| 6,122,103 | A | 9/2000 | Perkins |
| 6,486,997 | B1 | 11/2002 | Bruzzone |
| 6,498,683 | B2 | 12/2002 | Condo |
| 6,806,642 | B2 | 10/2004 | Pires |
| 8,471,463 | B2 * | 6/2013 | Sumida ............... H01L 51/5275 313/483 |
| 8,593,590 | B2 | 11/2013 | Jung |
| 2002/0159019 | A1 | 10/2002 | Pokorny |
| 2004/0061812 | A1 * | 4/2004 | Maeda ............. G02F 1/133615 349/65 |
| 2007/0127126 | A1 * | 6/2007 | Terada ................... G02B 5/282 359/586 |
| 2007/0200479 | A1 | 8/2007 | Jean |
| 2007/0287009 | A1 * | 12/2007 | Okude .................. G02B 5/305 428/411.1 |
| 2008/0113214 | A1 | 5/2008 | Davis |
| 2008/0213508 | A1 | 9/2008 | Nagasawa |
| 2009/0059554 | A1 | 3/2009 | Skipor |
| 2010/0051760 | A1 | 3/2010 | Yang |
| 2010/0165660 | A1 | 7/2010 | Weber |
| 2010/0208493 | A1 | 8/2010 | Choi |
| 2010/0238374 | A1 | 9/2010 | Ohse |
| 2011/0044046 | A1 | 2/2011 | Abu-Ageel |
| 2011/0141769 | A1 | 6/2011 | Lee |
| 2012/0039089 | A1 | 2/2012 | Hao |
| 2012/0113672 | A1 | 5/2012 | Dubrow |
| 2012/0154464 | A1 * | 6/2012 | Ninan ................ G02B 27/2264 345/691 |
| 2013/0087763 | A1 * | 4/2013 | Kim ...................... H01L 33/007 257/13 |
| 2013/0335677 | A1 * | 12/2013 | You ................... G02F 1/133609 349/65 |
| 2014/0242321 | A1 * | 8/2014 | Schmid .................... C08J 7/042 428/68 |
| 2014/0254125 | A1 | 9/2014 | Nevitt |

FOREIGN PATENT DOCUMENTS

| | | |
|---|---|---|
| EP | 2392852 | 7/2011 |
| JP | 2010-164689 | 7/2010 |
| JP | 2010-262060 | 11/2010 |
| JP | 2011-118187 | 6/2011 |
| KR | 10-2012-0049532 | 5/2012 |
| TW | 2009-36373 | 5/2009 |
| WO | WO 2010-012864 | 2/2010 |
| WO | WO 2010-120422 | 10/2010 |
| WO | WO 2010-120468 | 10/2010 |
| WO | WO 2010-120845 | 10/2010 |
| WO | WO 2010-120864 | 10/2010 |
| WO | WO 2010-120871 | 10/2010 |
| WO | WO 2010-120971 | 10/2010 |
| WO | WO 2010-121019 | 10/2010 |
| WO | 2011/050226 | 4/2011 |
| WO | WO 2011-050228 | 4/2011 |
| WO | WO 2011-068682 | 6/2011 |
| WO | WO 2012/138038 | 10/2012 |
| WO | WO 2012/144720 | 10/2012 |
| WO | WO 2013/012193 | 1/2013 |
| WO | WO 2014-123724 | 8/2014 |

OTHER PUBLICATIONS

Moon, "Phosphor concentration and geometry for high power white light emitting diode," Light-Emitting Diodes: Materials, Devices, and Applications for Solid State Lighting XIV, Feb., 2010, vol. 7617, pp. 76171Y-1-76171Y-8.

International Search Report for PCT International Application No. PCT/US2014/014539, dated May 21, 2014, 4 pages.

* cited by examiner

INTEGRATED QUANTUM DOT OPTICAL CONSTRUCTIONS

FIELD

The disclosure relates to integrated quantum dot optical constructions and, in particular, to integrated quantum dot optical constructions including a low refractive index element.

BACKGROUND

Liquid crystal displays (LCDs) are non-emissive displays that utilize a separate backlight unit and red, green, and blue color filters for pixels to display a color image on a screen. The red, green, and blue color filters each transmit light within a narrow wavelength band and absorb all other visible wavelengths, resulting in significant optical loss. The red, green, and blue color filters each transmit only light of a specific wavelength, resulting in significant optical loss. Thus, a high luminance backlight unit is needed to produce an image with sufficient luminance.

BRIEF SUMMARY

The disclosure relates to integrated quantum dot optical constructions and, in particular, to integrated quantum dot optical constructions including a low refractive index element. The disclosure also relates to quantum dot optical constructions to increase color gamut of LCD displays.

In many embodiments an optical construction includes a quantum dot film element including a plurality of quantum dots, a first optical recycling element, and a first low refractive index element separating the quantum dot film element from the first optical recycling element. The first low refractive index element has a refractive index of 1.3 or less.

In further embodiments an optical construction includes a quantum dot film element including a plurality of quantum dots, a light reflecting element, and a first low refractive index element separating the quantum dot film element from the light reflecting element. The first low refractive index element has a refractive index of 1.25 or less.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
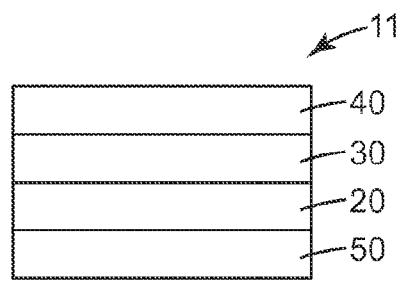
FIG. 1 is a schematic cross-sectional view of an illustrative integrated quantum dot construction.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "refractive index" or "index of refraction," refers to the absolute refractive index of a material that is understood to be the ratio of the speed of electromagnetic radiation in free space to the speed of the radiation in that material. The refractive index can be measured using known methods and is generally measured using an Abbe refractometer in the visible light region (available commercially, for example, from Fisher Instruments of Pittsburgh, Pa.). It is generally appreciated that the measured index of refraction can vary to some extent depending on the instrument.

The term "optical recycling element" refers to an optical element that recycles or reflects a portion of incident light and transmits a portion of incident light. Illustrative optical recycling elements include reflective polarizers, microstructured films, metallic layers, multi-layer optical film and combinations thereof.

The disclosure relates to integrated quantum dot optical constructions and, in particular, to integrated quantum dot optical constructions including a low refractive index element, among other aspects. The combination of a quantum dot film element in contact with a low refractive index element improves the optical quality of light emitted from and/or through the integrated quantum dot optical construction. These integrated quantum dot optical constructions can increase the color gamut of an associated LCD display. These integrated quantum dot optical constructions can provide a simple single "drop-in" solution that improves the image quality of displayed images illuminated with a back light, for example.

The quantum dot film element can be integrated into a backlight either through unitary optical components or integration with the light guide element or the liquid crystal panel using low index coatings or elements. While the present disclosure is not so limited, an appreciation of various aspects of the disclosure will be gained through a discussion of the examples provided below.

Most optical components in a backlight are designed for a lambertian light input. Some perform better with collimated and/or directional light. But none are designed to work well with an isotropic light input. When laminating an optical component directly to a down converting element, there is no air (low refractive index) interface and the input light has the same angular distribution as the emission distribution of the dots, which is isotropic. A low index coating acts as an air interface that TIRs a substantial portion of the high angle rays thus converting the input light distribution from isotropic to a more lambertian distribution. When isotropic input light is used with these elements, brightness and contrast of the LCD display are reduced and color artifacts can appear. Utilizing the constructions described herein can reduce or eliminate these issues.

The integrated quantum dot optical constructions include a low refractive index layer disposed on a quantum dot film element. This composite element can be utilized in any number of display devices and in any number of configurations. The low refractive index layer disposed on a quantum dot film element can be integrated into light guide, backlight or display panel.

In many embodiments an optical construction includes a quantum dot film element having a plurality of quantum dots, a first optical recycling element, and a first low refractive index element separating the quantum dot film element from the first optical recycling element. The first low refractive index element has a refractive index of 1.3 or less or 1.25 or less or 1.2 or less or 1.15 or less.

In other embodiments, an optical construction includes a quantum dot film element having a plurality of quantum dots, an light reflecting element and a first low refractive index element separating the quantum dot film element from the light reflecting element. The light reflecting element can be a specular or diffuse reflector. The first low refractive index element having a refractive index of 1.3 or less or 1.25 or less or 1.2 or less or 1.15 or less.

While quantum dot elements are specifically described herein, it is understood that any useful down converter can be utilized and is interchangeable with the quantum dot element. For example, in place of, or in addition to, the quantum dot element, the integrated optical construction can include a down converter such as a fluorescent dye or phosphor.

FIG. 1 is a schematic cross-sectional view of an illustrative integrated quantum dot construction 11.

Figure 2:
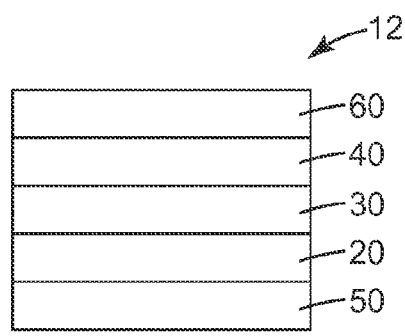
FIG. 2 is a schematic cross-sectional view of an illustrative integrated quantum dot construction on a display panel.

FIG. 2 is a schematic cross-sectional view of an illustrative integrated quantum dot construction 12 on a display panel 60. The optical constructions 11, 12 includes a quantum dot film element 20 having a plurality of quantum dots, a first optical recycling element 40, and a first low refractive index element 30 separating the quantum dot film element 20 from the first optical recycling element 40. In some embodiments, a diffuser element 50 is disposed on the quantum dot film element 20. These layers 20, 30, 40, 50 can be laminated or adhered to each other with an adhesive (not shown) or coated on each other to form a unitary composite article. The quantum dot construction 12 of FIG. 2 illustrates the combined low refractive index layer 30 and quantum dot film element 20 disposed on a display panel 60 (e.g., LCD panel).

Figure 3:
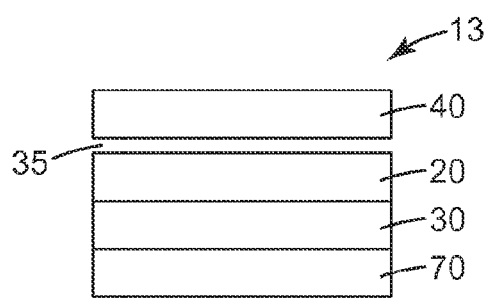
FIG. 3 is a schematic cross-sectional view of illustrative integrated quantum dot construction on a light guide element.
Figure 4:
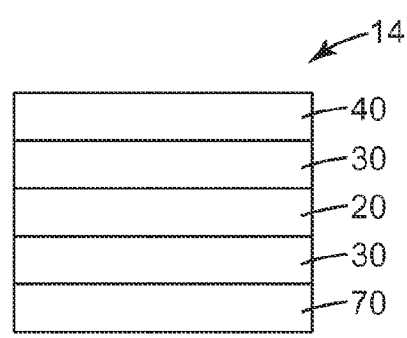
FIG. 4 is a schematic cross-sectional view of another illustrative integrated quantum dot construction on a light guide panel.

FIG. 3 is a schematic cross-sectional view of illustrative integrated quantum dot construction 13 on a light guide element 70. FIG. 4 is a schematic cross-sectional view of another illustrative integrated quantum dot construction 14 on a light guide panel 70. The optical construction 13 includes a quantum dot film element 20 having a plurality of quantum dots, a first optical recycling element 40, and a first low refractive index element 30 separating the quantum dot film element 20 from a light guide element 70. An air gap 35 separates the quantum dot film element 20 from the first optical recycling element 40. These layers 20, 30, 70 can be laminated or adhered to each other with an adhesive (not shown) or coated on each other to form a unitary composite article. The light guides 70 described herein can be any useful light guide such as a backlight light guide, for example.

The optical construction 14 includes a quantum dot film element 20 having a plurality of quantum dots, a first optical recycling element 40, and a first low refractive index element 30 separating the quantum dot film element 20 from the first optical recycling element 40. A second low refractive index element 30 separates the quantum dot film element 20 from a light guide element 70. These layers 20, 30, 40, 70 can be laminated or adhered to each other with an adhesive (not shown) or coated on each other to form a unitary composite article. The light guides 70 described herein can be any useful light guide such as a backlight light guide, for example.

Figure 5:
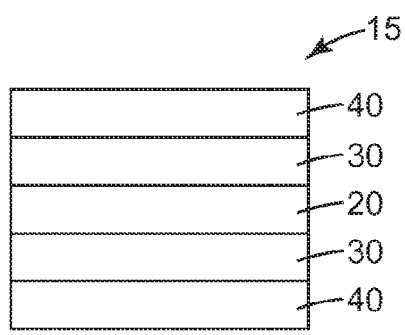
FIG. 5 is a schematic cross-sectional view of another illustrative integrated quantum dot construction.

FIG. 5 is a schematic cross-sectional view of another illustrative integrated quantum dot construction 15. The optical construction 15 includes a quantum dot film element 20 having a plurality of quantum dots, a first optical recycling element 40, and a first low refractive index element 30 separating the quantum dot film element 20 from the first optical recycling element 40. A second low refractive index element 30 separates the quantum dot film element 20 from a second optical recycling element 40. These layers 20, 30, 40 can be laminated or adhered to each other with an adhesive (not shown) or coated on each other to form a unitary composite article.

Figure 6:
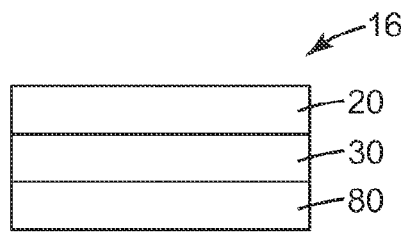
FIG. 6 is a schematic cross-sectional view of an illustrative integrated quantum dot construction.

FIG. 6 is a schematic cross-sectional view of an illustrative integrated quantum dot construction 16. The optical construction 16 includes a quantum dot film element 20 having a plurality of quantum dots, an light reflecting element 80 and a first low refractive index element 30 separating the quantum dot film element 20 from the light reflecting element 80. The light reflecting element 80 can be a specular, diffuse or semi-specular reflector. These layers 20, 30, 80 can be laminated or adhered to each other with an adhesive (not shown) or coated on each other to form a unitary composite article.

Another embodiment of FIG. 6 is an integrated quantum dot construction on a display panel where the display panel replaces the light reflecting element 80. Thus this optical construction 16 includes a quantum dot film element 20 having a plurality of quantum dots, a display panel 80 (e.g., LCD panel) and a first low refractive index element 30 separating the quantum dot film element 20 from the display panel 80. In many embodiments, quantum dot film element 20 is disposed on the incident light surface of the display panel 80. These layers 20, 30, 80 can be laminated or adhered to each other with an adhesive (not shown) or coated on each other to form a unitary composite article The illustrative integrated quantum dot constructions described herein can be incorporated into an optical display in any useful manner. A description of the elements or layers forming these integrated quantum dot constructions is further described herein.

The quantum dot film element refers to a layer or film of resin or polymer material that includes a plurality of quantum dots or quantum dot material. In many embodiments, this material is sandwiched between two barrier films. Suitable barrier films include plastic, glass or dielectric materials, for example. The barrier film can include a flexible glass such as those available from Corning (e.g., Willow™ Glass), Nippon Electric, and Schott (e.g., Ultra-thin Glass). In one or more embodiments the barrier film can form at least a portion of a light guide or display panel.

The quantum dot film element can include one or more populations of quantum dot material. Exemplary quantum dots or quantum dot material emit green light and red light upon down-conversion of blue primary light from the blue LED to secondary light emitted by the quantum dots. The respective portions of red, green, and blue light can be controlled to achieve a desired white point for the white light emitted by the display device incorporating the quantum dot film element. Exemplary quantum dots for use in integrated quantum dot constructions described herein include CdSe or ZnS. Suitable quantum dots for use in integrated quantum dot constructions described herein include core/shell luminescent nanocrystals including CdSe/ZnS, InP/ZnS, PbSe/PbS, CdSe/CdS, CdTe/CdS or CdTe/ZnS In exemplary embodiments, the luminescent nanocrystals include an outer ligand coating and are dispersed in a polymeric matrix. Quantum dot and quantum dot material are commercially available from Nanosys Inc., Palo Alto, Calif.). In many embodiments, the refractive index of the quantum dot film element is in a range from 1.4 to 1.6, or from 1.45 to 1.55.

The low refractive index element refers to a layer or film of polymeric material that has a refractive index over visible wavelengths in a range from 1.1 to 1.3, or from 1.15 to 1.25, or 1.3 or less, or 1.25 or less, or 1.20 or less, or 1.15 or less, for example. Thus, the low refractive index element can approximate an air gap, but such a layer still effectively allows light to propagate a range of supercritical angles. In many embodiments, the low refractive index element can be coated onto almost any optical film or layer described herein, so as to approximate an air gap, and then any conventional optical adhesive can be applied to join the coated film with another component in the system. Suitable low refractive index element materials are described in, for example, the following PCT Published Applications: "Gradient Low Index Article and Method" WO2011/050228; "Optical Film" WO2010/120864; "Optical Construction and Display System Incorporating Same" WO2010/120971; "Retroreflecting Optical Construction" WO2010/121019; "Optical Film for Preventing Optical Coupling" WO2010/120871; "Backlight and Display System Incorporating Same" WO2010/120845; "Process and Apparatus for Coating with Reduced Defects" WO2010/120422; "Process and Apparatus for A Nanovoided Article" WO2010/120468; and US2010/051760 entitled "Optical Construction and Method of Making the Same." Ultra-low index materials can also be made using a nanoporous fumed silica composite. In many cases, the low refractive index element material may be porous, and in some cases techniques can be used to seal the outer surface of a layer of material so that liquid material from an adjacent layer, for example, an adhesive layer, does not completely migrate into the pores of the layer. Such techniques are disclosed in one or more of the cited applications.

Illustrative optical recycling elements include reflective polarizers, micro-structured films, metallic layers, multi-layer optical film and combinations thereof. Micro-structured films include brightness enhancing films. The multi-layer optical film can selectively reflect one polarization of light (e.g., reflective polarizer described below) or can be none selective with respect to polarization.

In many examples the optical recycling element reflects or recycles at least 50% of incident light, or at least 40% or incident light or at least 30% of incident light. In some embodiments the optical recycling element includes a metallic layer.

The reflective polarizer can be any useful reflective polarizer element. A reflective polarizer transmits light with a single polarization state and reflects the remaining light. Illustrative reflective polarizers include birefringent reflective polarizers, fiber polarizers and collimating multilayer reflectors. A birefringent reflective polarizer includes a multilayer optical film having a first layer of a first material disposed (e.g., by coextrusion) on a second layer of a second material. One or both of the first and second materials may be birefringent. The total number of layers may be tens, hundreds, thousands or more. In some exemplary embodiments, adjacent first and second layers may be referred to as an optical repeating unit. Reflective polarizers suitable for use in exemplary embodiments of the present disclosure are described in, for example, U.S. Pat. Nos. 5,882,774, 6,498,683, 5,808,794, which are incorporated herein by reference.

Any suitable type of reflective polarizer may be used for the reflective polarizer, e.g., multilayer optical film (MOF) reflective polarizers; diffusely reflective polarizing film (DRPF), such as continuous/disperse phase polarizers; wire grid reflective polarizers; or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.). Commercially available examples of MOF reflective polarizers include 3M DBEF-D2-400 and DBEF-D4-400 multilayer reflective polarizers that include diffusive surfaces, available from 3M Company.

In one or more embodiments a collimating multilayer optical film (CMOF) can be utilized as a reflective polarizer. These CMOFs are described in provisional application U.S. 61/549,588 filed 20 Oct. 2011. Examples of DRPF useful in connection with the present disclosure include continuous/ disperse phase reflective polarizers as described, e.g., in co-owned U.S. Pat. No. 5,825,543 (Ouderkirk et al.), and diffusely reflecting multilayer polarizers as described, e.g., in co-owned U.S. Pat. No. 5,867,316 (Carlson et al.). Other suitable types of DRPF are described in U.S. Pat. No. 5,751,388 (Larson).

Some examples of wire grid polarizers useful in connection with the present disclosure include those described, e.g., in U.S. Pat. No. 6,122,103 (Perkins et al.). Wire grid polarizers are commercially available, inter alia, from Moxtek Inc., Orem, Utah. Some examples of cholesteric polarizers useful in connection with the present disclosure include those described, e.g., in U.S. Pat. No. 5,793,456 (Broer et al.), and U.S. Patent Publication No. 2002/0159019 (Pokorny et al.). Cholesteric polarizers are often provided along with a quarter wave retarding layer on the output side so that the light transmitted through the cholesteric polarizer is converted to linearly polarized light.

In a birefringent reflective polarizer, the refractive indices of the first layers ($n_{1x}$, $n_{1y}$, $n_{1z}$) and those of the second layers ($n_{2x}$, $n_{2y}$, $n_{2z}$) are substantially matched along one in-plane axis (y-axis) and are substantially mismatched along another in-plane axis (x-axis). The matched direction (y) forms a transmission (pass) axis or state of the polarizer, such that light polarized along that direction is preferentially transmitted, and the mismatched direction (x) forms a reflection (block) axis or state of the polarizer, such that light polarized along that direction is preferentially reflected. Generally, the larger the mismatch in refractive indices along the reflection direction and the closer the match in the transmission direction, the better the performance of the polarizer.

A multilayer optical film typically includes individual microlayers having different refractive index characteristics so that some light is reflected at interfaces between adjacent microlayers. The microlayers are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. However, thicker layers can also be included, such as skin layers at the outer surfaces of the multilayer optical film, or protective boundary layers (PBLs) disposed between the multilayer optical films, that separate the coherent groupings of microlayers. Such a multilayer optical film body can also include one or more thick adhesive layers to bond two or more sheets of multilayer optical film in a laminate.

In some cases, to function well for wide angle viewing of an emissive display device, a birefringent reflective polarizer maintains a high block state contrast for all angles of incidence and also maintains a high pass transmission over all angles of incidence. As it has been shown in the commonly owned U.S. Pat. No. 5,882,774, pass state transmission increases when the refractive indices of the alternating first and second layers and are matched for light polarized along the z-axis and for light polarized along the y-axis. The z-index matching also ensures that the block state transmission does not degrade at high angles of incidence. One specific useful birefringent reflective polarizer is a birefringent polymeric multi-layer polarizing film known under the trade designation "3M Advanced Polarizing Film" or "APF." U.S. Pat. No. 6,486,997, mentions the use of such a film as a PBS.

In some cases to function well for wide angle viewing of an emissive display device, the reflective polarizer has a reflectivity that generally increases with angle of incidence, and a transmission that generally decreases with angle of incidence. Such reflectivity and transmission may be for unpolarized visible light in any plane of incidence, or for light of a useable polarization state incident in a plane for which oblique light of the useable polarization state is p-polarized, or an orthogonal plane for which oblique light of the useable polarization state is s-polarized. This behavior can be desirable for some displays in order to emit more light at viewing angles more important to the display industry. This effect is called collimation. Examples of these types of films are described in U.S. Patent Application 2010/0165660 and Attorney Docket #68819US002.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms can range from about 1 to about 75 micrometers. When used in an optical construction or display such as that found in laptop computers, watches, etc., this microstructured optical film can increase brightness of an optical construction or display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

Brightness enhancing films include microstructure-bearing articles having a regular repeating pattern of symmetrical tips and grooves. Other examples of groove patterns include patterns in which the tips and grooves are not symmetrical and in which the size, orientation, or distance between the tips and grooves is not uniform. Examples of brightness enhancing films are described in Lu et al., U.S. Pat. No. 5,175,030, and Lu, U.S. Pat. No. 5,183,597, incorporated herein by reference.

The diffuser described herein can be a beaded gain diffuser, a microstructured gain diffuser, diffuser sheet materials such as bulk diffusers (particle filled, phase separated, or microcavitated), or diffuser plates. The diffuser can provide sufficient diffusion of light to achieve uniform light transmission through the integrated quantum dot optical construction. The diffusers transmit as least 50%, or at least 70%, or at least 90% of the visible light incident upon them, while exhibiting low clarity as measured by the Haze-Gard product from BYK-Gardner USA.

Some of the advantages of the disclosed integrated quantum dot optical constructions are further illustrated by the following examples. The particular materials, amounts and dimensions recited in this example, as well as other conditions and details, should not be construed to unduly limit the present disclosure.

EXAMPLES

Comparative Example (C1)—No Low Index Layer

An optical film stack was assembled on a liquid crystal display panel as follows. The liquid crystal display panel was a twisted nematic panel taken from a LTM200KT07 monitor from Samsung Electronics Co., Ltd. (Seoul, Korea). An Advanced Polarizing Film (APF) from 3M Company (St. Paul Minn.) was laminated to the LCD panel using 3M Optically Clear Adhesive 8171. Then a Quantum Dot Enhancement Film (QDEF) from Nanosys Inc. (Palo Alto Calif.), containing red and green emitting quantum dots, was attached to the APF with the same optically clear adhesive. The optical stack was illuminated with 80 Luxeon Rebel LXML PRO1 0425 bin F5D royal blue LEDs from Philips Lumileds Lighting Company (San Jose, Calif.). These LEDs replaced the standard LEDs customarily used in the Samsung monitor identified above. The LEDs were arranged on the edge of a standard ink-printed solid light guide, and the light guide was placed below the QDEF. Luminance and color coordinates of the white point of the assembly were then measured using a Conostage 3 conoscope from Autronic-Melchers GmbH (Karlsruhe, Germany). The luminance was 137 nits, and the coordinates of the white point were cx=0.181 and cy=0.137.

Example 1—With Low Index Layer

An optical film stack was assembled as in the comparative example (C1), except that an additional film was inserted between the APF and the QDEF. The additional film was a PET film with a thickness of 2 mils coated with a low index material as described in WO2010/12864 with a refractive index of 1.20. (The haze of this low index layer was 1.36%, clarity was 99.8%, and transmission was 94%.) The thickness of the coating was 8 micrometers. This film was adhered to the APF above and the QDEF below with the same optically clear adhesive described above. The optical stack was illuminated as before Luminance and color coordinates of the white point were measured as in the comparative example. The luminance for this configuration was 340 nits. The white point had coordinates $c_x$=0.204 and $c_y$=0.200.

The performance of the two samples are reported in Table 1.

TABLE 1

| Example | L (nits) | Cx | Cy |
| --- | --- | --- | --- |
| C1 - w/o ULI | 137 (40%) | 0.181 | 0.137 |
| 1 - w/ULI | 340 (100%) | 0.204 | 0.200 |

The measurements for Table 1 were performed using an Autronic Melchers ConoScope (Karlsruhe, Germany).

Table 1 demonstrates the performance improvement that occurs by integrating the QDEF with a ULI layer. The improvement of having the ULI layer was a 148% improvement in luminance and a 0.067 change in the CIE 1931 color coordinates towards a more preferred white point of D65.

Thus, embodiments of INTEGRATED QUANTUM DOT OPTICAL CONSTRUCTIONS are disclosed. One skilled in the art will appreciate that the compositions described herein can be practiced with embodiments other than those disclosed. The disclosed embodiments are presented for purposes of illustration and not limitation.

What is claimed is:

1. An optical construction comprising:
   a quantum dot film element comprising a plurality of quantum dots;
   a first optical recycling element; and
   a first low refractive index element separating the quantum dot film element from the first optical recycling element, the first low refractive index element comprising a single low refractive index layer having a refractive index of 1.3 or less.

2. The optical construction of claim 1, further comprising an LCD panel disposed on the first optical recycling element.

3. The optical construction of claim 1, further comprising an optical diffuser element disposed on the quantum dot film element.

4. The optical construction of claim 1, further comprising a second optical recycling element disposed on the quantum dot film element.

5. The optical construction of claim 1, further comprising a second low refractive index element separating the quantum dot film element from an optical element, the second low refractive index element having a refractive index of 1.25 or less.

6. The optical construction of claim 5, wherein the optical element is a second optical recycling element.

7. The optical construction of claim 5, wherein the optical element is a light guide element.

8. The optical construction of claim 1 wherein the first optical recycling element comprises a reflective polarizer.

9. The optical construction of claim 1 wherein the first optical recycling element comprises a microstructured brightness enhancing film.

10. The optical construction of claim 6 wherein the second optical recycling element comprises a reflective polarizer.

11. The optical construction of claim 1 wherein the first low refractive index element has a refractive index of 1.2 or less.

12. The optical construction of claim 5 wherein the second low refractive index element has a refractive index of 1.2 or less.

13. The optical construction of claim 1 wherein the optical construction is a unitary composite article.

* * * * *